Jan. 24, 1939.　　　B. COPOUS　　　2,145,179
ANIMAL YOKE
Filed July 5, 1938
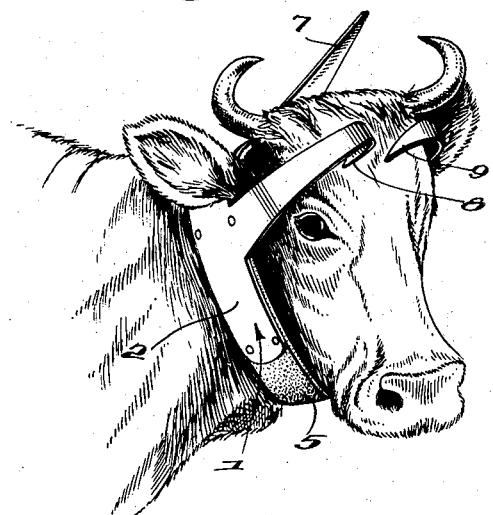
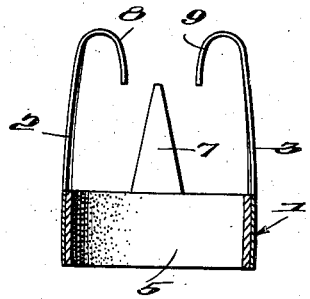
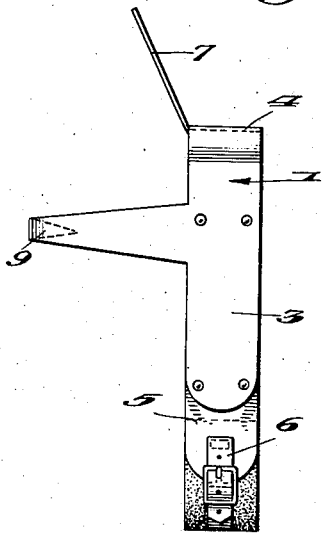
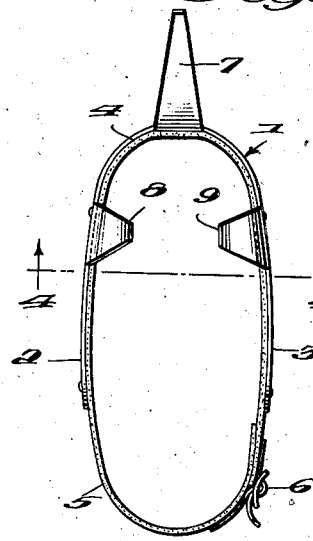
Inventor:-
Bill Copous,
By Smith, Michael & Gardiner,
Attorneys.

Patented Jan. 24, 1939

2,145,179

UNITED STATES PATENT OFFICE 2,145,179

ANIMAL YOKE

Bill Copous, New Albany, Miss.

Application July 5, 1938, Serial No. 217,546

8 Claims. (Cl. 119—136)

This invention relates to animal yokes, and has particular reference to a device supported by the neck of the animal and including means for inflicting pain upon the animal in the event that such animal attempts to butt down, tear or otherwise break through a fence or other confining means or obstruction.

It is an object of this invention to provide an animal yoke which may be readily applied to, and retained on, the animal and which includes a pair of forwardly-extending arms positioned at opposite sides of the head of the animal and terminating in return bend prongs or points adapted, when the animal attempts to butt down or tear through a fence or obstruction, to penetrate the forehead of the animal to thus cause the animal to cease its butting or tearing-through activities.

It is an object of the invention to provide an animal yoke of greatly simplified construction as compared with the animal yokes of the prior art, and one which will effectively prevent the animal from butting down, tearing through or demolishing fences or the like, and one which will effectively prevent the animal from pushing or butting obstructions or other animals or stock, and one which will perform its intended function without interfering with the normal or routine activiies of the animal such as grazing, feeding, drinking, etc.

It is a further object of this invention to provide an animal yoke comprising a U-shaped body portion, the spaced, parallel arms of which are adapted for disposal on opposite sides of the neck portion of the animal and behind the horns and ears thereof, said body portion having attached thereto or formed integrally therewith, an upwardly projecting portion terminating considerably above the head of the animal and adapted to engage a wire or strand of a fence when the animal attempts to crawl or pass through said fence, said U-shaped body portion also having attached thereto or formed integral therewith a pair of arms which extend along opposite sides of the head of the animal and which terminate in inturned prongs or points adapted to be forced into the forehead of the animal when the upwardly extending portion contacts with the wire or strand of a fence through which the animal is endeavoring to pass.

It is a still further object of this invention to provide an animal yoke of the above referred to character that is simple in construction and operation, cheap and easy to manufacture, readily applicable to and detachable from the head of an animal, and which is highly efficient in the purposes for which designed.

In the accompanying drawing wherein for the purpose of illustration, I have shown a preferred embodiment of my invention, Figure 1 is a perspective view of the animal yoke showing the same in applied position on the head of a cow, Figures 2 and 3 are, respectively, side and front elevations of the improved animal yoke of my invention, and, Figure 4 is a transverse sectional view on the line 4—4 of Figure 3.

Referring to the drawing wherein like reference numerals have been employed to designate like parts throughout the several views, the numeral 1 designates broadly the U-shaped body portion of the improved animal yoke, which body portion may be made of relatively light metal or other material, such as aluminum or the like, and which includes spaced, substantially parallel arms 2 and 3 connected at their upper ends by an arcuate central or intermediate portion 4. The substantially U-shaped body portion 1 is attached, by means of rivets or other suitable fastening means, to a halter portion 5 of leather or the like, which lines the said body portion 1 and which has at the free ends thereof, a strap-and-buckle connection 6. The space between the substantially parallel arms 2 and 3 is substantially equal to the transverse width of the neck of the animal to which the yoke is to be applied, and said arms 2 and 3 extend downwardly along the sides of the neck of the animal as clearly shown in Figure 1 of the accompanying drawing. As will be readily apparent, the halter portion 5 extends beyond the lower ends of the arms 2 and 3, and, by means of the end fastenings, such as the strap-and-buckle connection 6, the yoke may be attached to the neck of the animal with the arcuate central or intermediate portion 4 overlying the upper neck portion of the animal and positioned behind the ears and horns of the said animal.

The body portion 1 has attached thereto or formed integral therewith, an upwardly extending member 7, this member being located at the approximate center of the arcuate central or intermediate portion 4 and terminating considerably above the head and horns of the cow or other animal to which the yoke is applied. It will be apparent that should the animal to which the yoke is applied attempt to crawl or pass through a fence, such as a horizontal panel, horizontal wire or barbed wire fence or the like, the upwardly extending member 7 will engage the panel or wire in such a manner as to frustrate the attempt.

The body portion 1 has attached thereto or formed integral therewith, the pair of arms 2 and 3 which are substantially parallel to each other and substantially normal to the plane of the body portion 1, and which terminate in return bends 8 and 9 which are pointed to provide means for inflicting pain upon the animal when said pointed return bends are forced into contact with the forehead of the animal to which the yoke is applied, it being obvious that when the animal endeavors to crawl or pass though a fence, the upwardly extending portion 7 will engage a panel or strand of said fence, and that the continued forward movement of the animal will force the yoke rearwardly along the neck of the animal to cause the pointed ends of the return bends 8 and 9 to penetrate the forehead of the animal.

When attaching the yoke to an animal, the strap-and-buckle connection 6 is disengaged and the U-shaped body portion is moved downwardly of the neck and behind the ears and horns of the animal. When thus positioned, the strap-and-buckle connection 6 is engaged and fastened to retain the yoke on the neck of the animal. By reason of the fact that the arms 2 and 3 and the upwardly extending member 7 are positioned considerably above the mouth, nose and eyes of the animal, the presence of the device in no way interferes with the normal activities of the animal such as grazing, feeding, drinking, etc. If, however, the animal should attempt to crawl or pass through a fence, the upwardly extending member 7 would engage a strand of the fence and the continuous forward movement of the animal would result in the yoke being moved rearwardly along the animal's neck, whereupon the pointed return bends 8 and 9 would be positively forced into contact with the forehead of the animal, thus inflicting sufficient pain to cause the animal to cease its attempt to crawl or pass through the fence. Further, if the animal should attempt to butt down an obstruction or to butt or push other live stock, the pointed return bends 8 or 9 would be forced into contact with the forehead of the animal and sufficient pain would be inflicted upon the animal to cause it to desist from its butting or pushing activities.

In the preferred embodiment of my invention I contemplate cutting or stamping the body portion 1, including the central or intermediate portion 4, the arms 2 and 3, and the upwardly extending portion 7, from a sheet of metal or other suitable material, but it is to be understood that it is within the scope of my present invention to form the arms 2 and 3 and/or the upwardly extending portion 7 separately, and to attach these separately formed portions to the said body portion. Further, the strap-and-buckle connection 6 has been illustrated and described herein, but it is to be understood that other means may be employed for adjustably securing the yoke to the head of an animal. In other words, I have shown and described herein, the preferred embodiment of my present invention, but it will be understood that this is for illustrative purposes only, and that various changes may be made in the shape, size and arrangement of parts without departing from the spirit of my invention or the scope of the subjoined claims.

Having thus describe my present invention, I claim:—

1. An animal yoke including a body portion adapted to be secured on the neck of an animal, and a pair of arms each extending forwardly from said body portion along opposite sides of the head of the animal and terminating in front of the head of said animal, the terminal ends of said arms having sharpened portions adapted to be forced rearwardly into the head of the animal when the terminal ends of said arms are forced into contact with an obstruction.

2. An animal yoke including a body portion adapted to be secured on the neck of an animal, and a pair of arms each extending forwardly from said body portion along opposite sides of the head of the animal, each arm terminating in front of the head of said animal and including a sharpened return bend, the sharpened return bend portions of said arms being forced rearwardly into the head of the animal when said arms are forced into contact with an obstruction.

3. An animal yoke including a U-shaped body portion adapted to be secured on the neck of an animal with the substantially parallel arms of said body portion extending downwardly along opposite sides of the neck of said animal and with the central or intermediate portion of said U-shaped body member overlying the top of the neck of said animal, and an arm extending forwardly from an arm of the body member and terminating in front of the head of said animal, the terminal end of said forwardly-extending arm having a sharpened portion adapted to be forced rearwardly into the head of the animal when said terminal end is forced into contact with an obstruction.

4. An animal yoke including a U-shaped body portion adapted to be secured on the neck of an animal with the substantially parallel arms of said body portion extending downwardly along the sides of the neck of said animal and with the central or intermediate portion of said U-shaped body member overlying the top of the neck of said animal, and a pair of arms each extending forwardly from the arms of the U-shaped body portion and along opposite sides of the head of the animal and terminating in front of the head of said animal, the terminal ends of said arms having sharpened portions adapted to be forced rearwardly into the head of the animal when the terminal ends of said arms are forced into contact with an obstruction.

5. An animal yoke including a body portion adapted to be secured on the neck of an animal, a pair of arms each extending forwardly from said body portion along opposite sides of the head of the animal and terminating in front of the head of said animal, the terminal ends of said arms having sharpened portions directed rearwardly toward the head of the animal, and an arm on said body member extending upwardly therefrom, said upwardly-extending arm adapted to engage an obstruction, the forceful engagement between said upwardly-extending arm and the obstruction forcing the sharpened portions of the forwardly-extending arms into the head of the animal.

6. An animal yoke including a U-shaped body portion adapted to be secured on the neck of an animal with the substantially parallel arms of said body portion extending downwardly along opposite sides of the neck of said animal and with the central or intermediate portion of said U-shaped body member overlying the top of the neck of said animal, an arm extending forwardly from an arm of the body member and terminating in front of the head of said animal, the terminal end of said forwardly-extending arm having a sharpened portion directed rearwardly toward the head of the animal, and an arm on said body member extending upwardly from the central or intermediate portion of said U-shaped body portion, said upwardly-extending arm adapted to engage an obstruction, the forceful engagement between said upwardly-extending arm and the obstruction forcing the sharpened portions of the forwardly-extending arm into the head of the animal.

7. An animal yoke including a U-shaped body portion, a halter portion secured to the inner side of the body portion and extending below the ends of said U-shaped body portion, said halter having fastening means at the free ends thereof for securing the yoke on the neck of an animal, and a pair of arms on said U-shaped body portion extending forwardly from said body portion at opposite sides thereof and terminating in front of the head of the animal, the terminal end of each of said arms having a sharpened portion adapted to be forced rearwardly into the head of the animal when said terminal portions are forced into contact with an obstruction.

8. An animal yoke including a U-shaped body portion adapted to be secured on the neck of an animal with the substantially parallel arms of said body portion extending downwardly along opposite side of the neck of said animal and with the central or intermediate portion of said U-shaped body member overlying the top of the neck of said animal, a halter portion lining said U-shaped body portion and extending below the free ends of the substantially parallel arms of said body portion, means adjacent the free ends of said halter portion for detachably securing the body portion in position on the neck of the animal, an arm formed integrally with said U-shaped body portion extending forwardly therefrom and terminating in front of the head of the animal, said arm terminating in a sharpened return bend adapted to be forced rearwardly into the head of the animal, and an arm formed integrally with said U-shaped body portion and extending upwardly therefrom above the head of the animal and adapted to engage an obstruction, the forceful engagement between said upwardly extending arm and the obstruction forcing the sharpened return bend portion into the head of the animal.

BILL COPOUS.